Oct. 25, 1949.  J. HALAHAN ET AL  2,486,157
PROJECTION MICROFILM READER
Filed Feb. 26, 1947  4 Sheets-Sheet 1
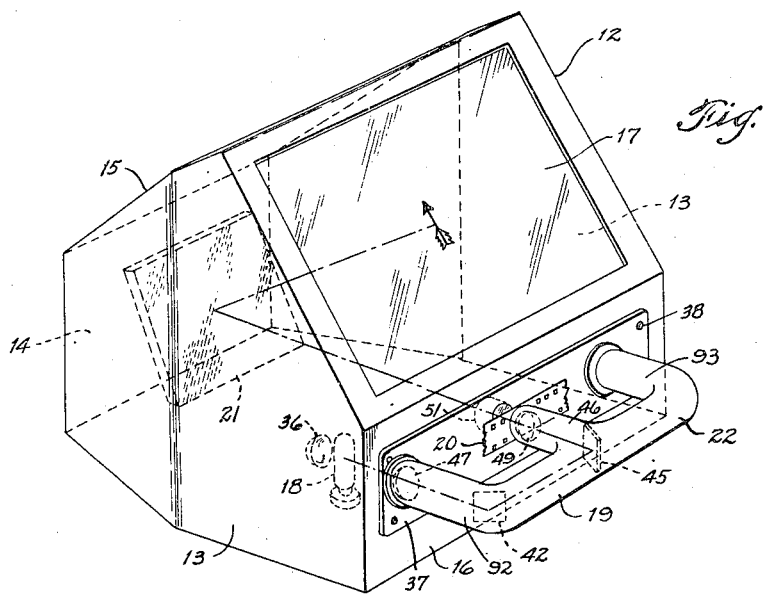
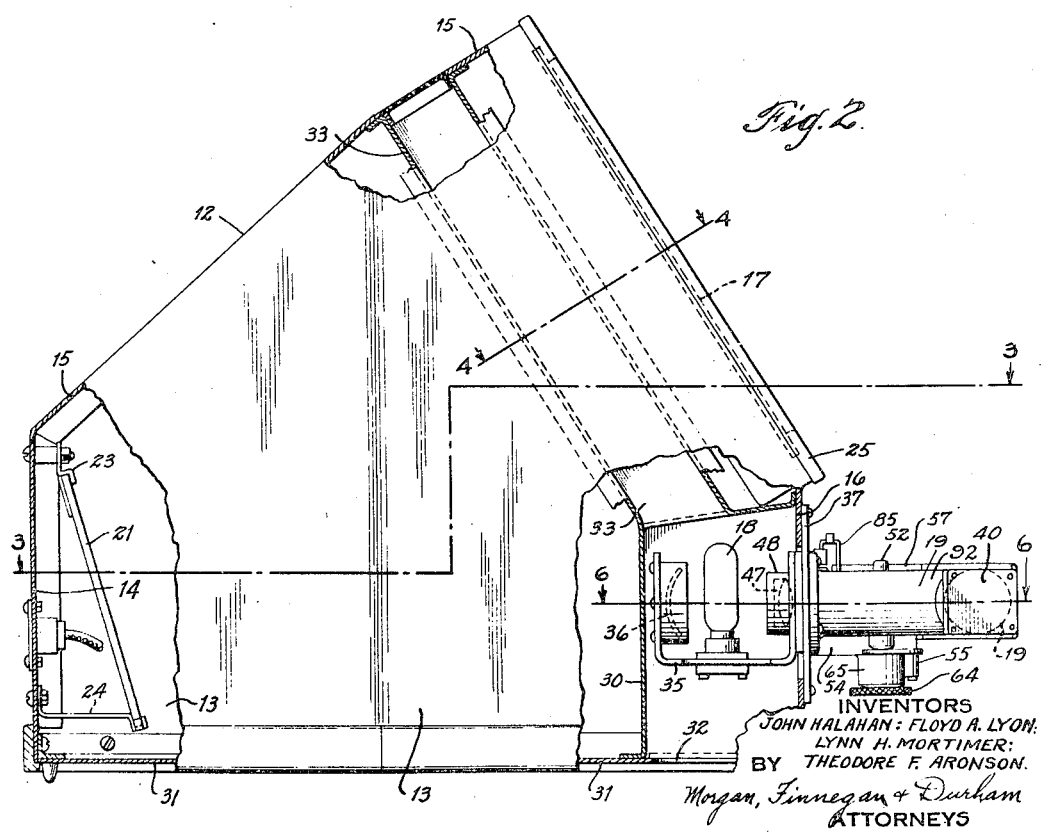
INVENTORS
JOHN HALAHAN; FLOYD A. LYON;
LYNN H. MORTIMER;
BY THEODORE F. ARONSON.
Morgan, Finnegan & Durham
ATTORNEYS

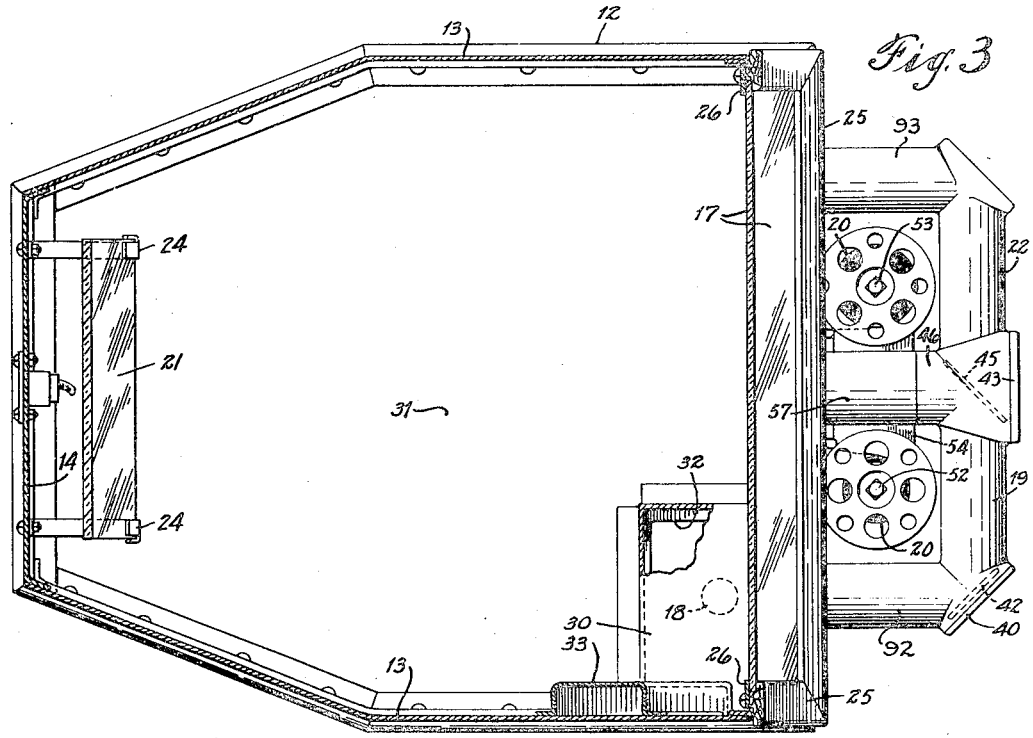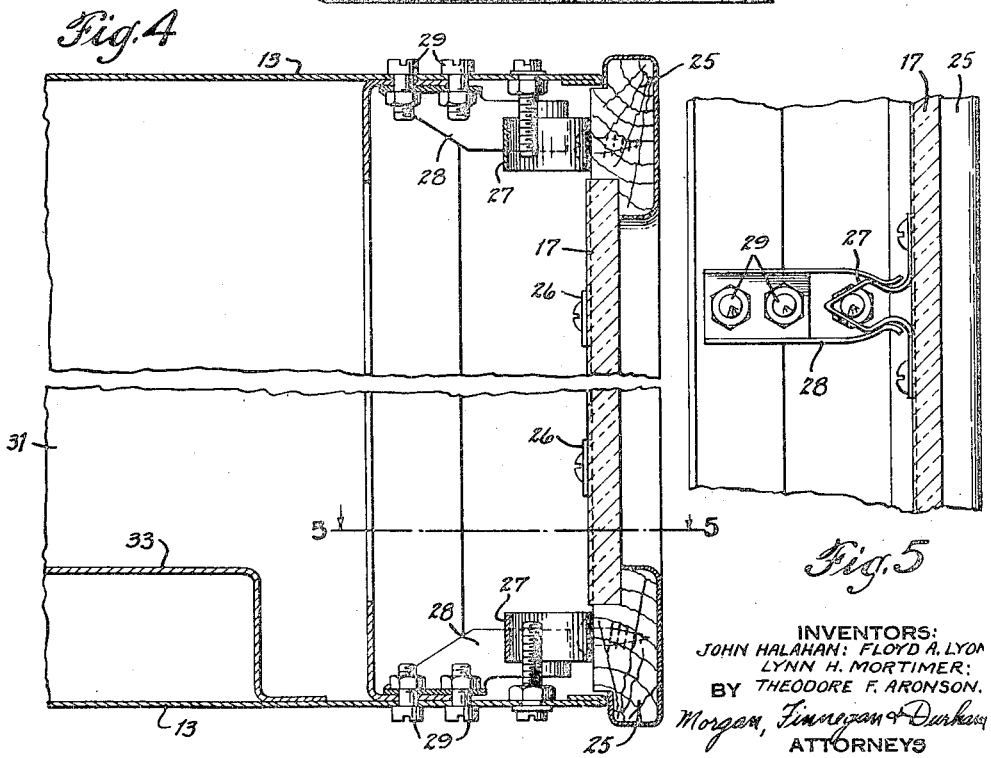

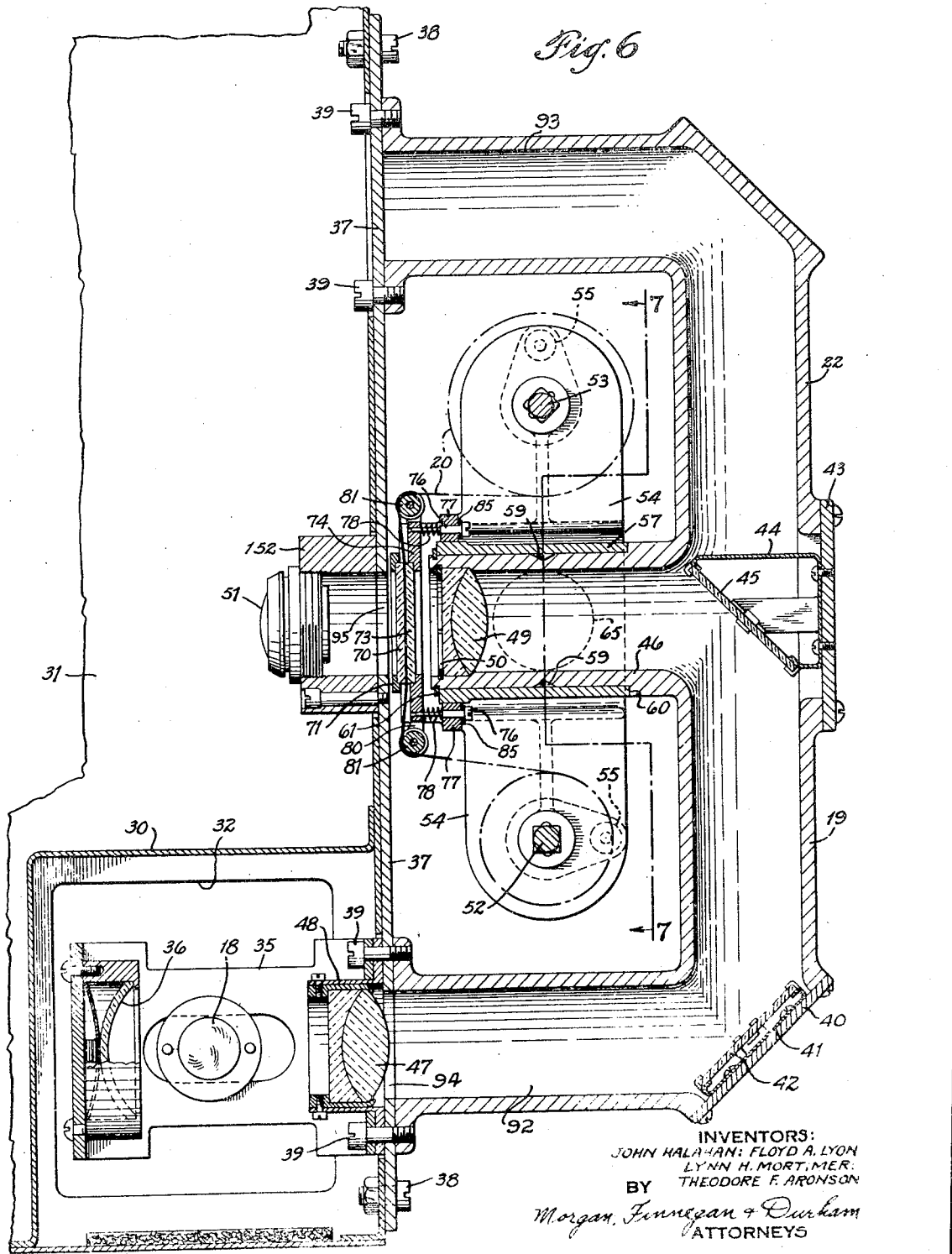

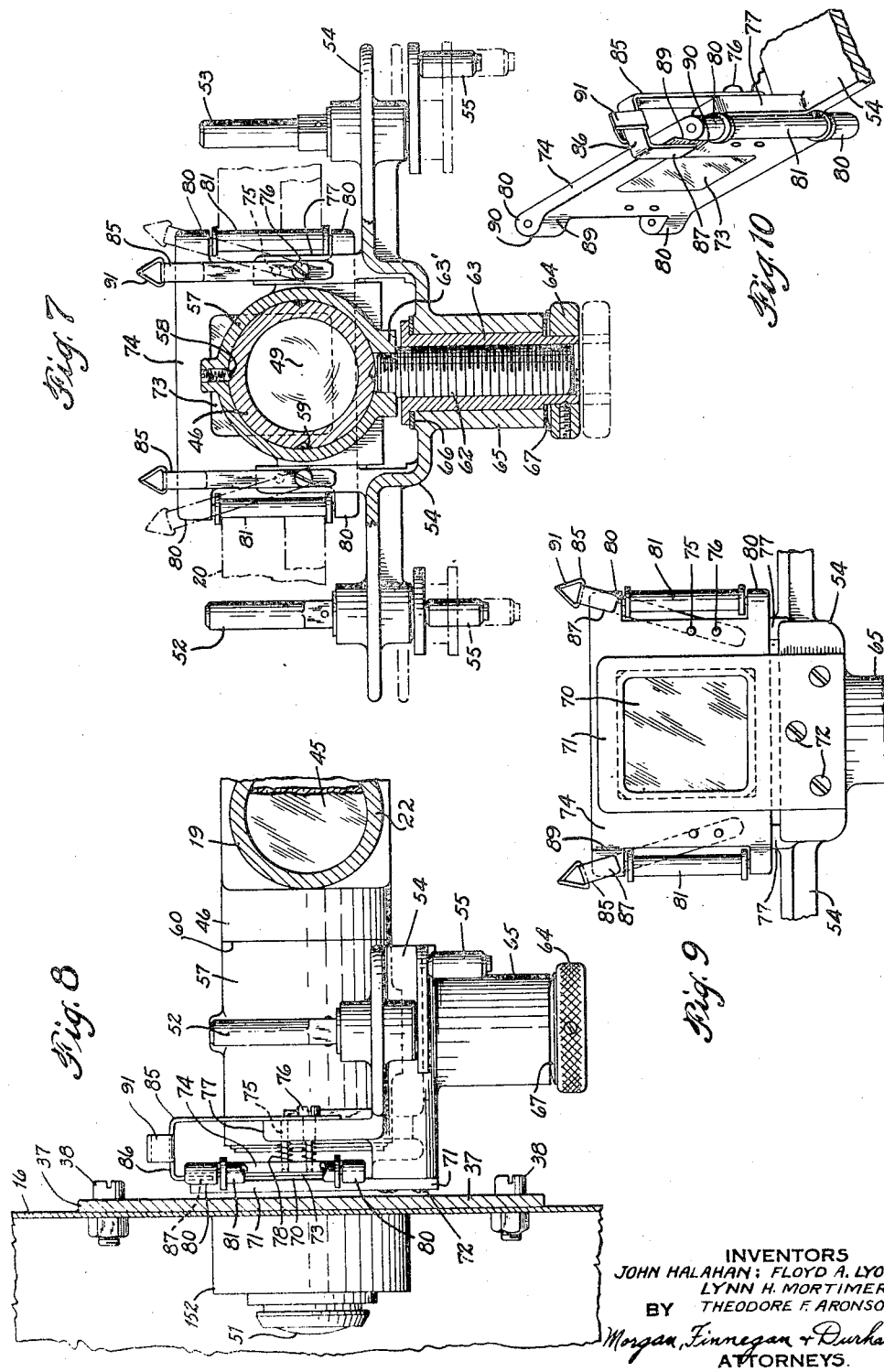

Patented Oct. 25, 1949

2,486,157

UNITED STATES PATENT OFFICE 2,486,157

PROJECTION MICROFILM READER

John Halahan, Jackson Heights, and Floyd A. Lyon, Hillside Heights, N. Y., and Lynn H. Mortimer, Caldwell, N. J., and Theodore F. Aronson, St. Albans, N. Y., assignors, by mesne assignments, to Bell & Howell Company, a corporation of Illinois Application February 26, 1947, Serial No. 730,895

6 Claims. (Cl. 88—24)

The present invention relates to a film viewer or reader particularly adapted for use with microfilm records.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a schematic perspective view of a film viewer or reader of a preferred and illustrative embodiment of the present invention;

Fig. 2 is a side elevation of the viewer shown in Fig. 1, certain parts being broken away to show other parts with greater clarity;

Fig. 3 is a cross-sectional view taken along line 3—3 of Fig. 2;

Fig. 4 is a cross-sectional view taken along line 4—4 of Fig. 2;

Fig. 5 is a detail sectional view taken along line 5—5 of Fig. 4;

Fig. 6 is a cross-sectional view taken along line 6—6 of Fig. 2;

Fig. 7 is a detail view of the film handling elements of the viewer as seen looking toward the left in Fig. 2; certain parts being shown in cross section for greater clarity;

Fig. 8 is a side view of the mechanism shown in Fig. 7;

Fig. 9 is a detail view of the film gate and associated mechanism as seen looking toward the right in Fig. 8; and showing pressure plate retractors in operation; and Fig. 10 is a fragmentary perspective view of the pressure plate and operating means therefor.

The present invention has for an object the provision of an improved film viewer or reader adapted particularly for the handling of microfilm records whereby the film may be efficiently projected in magnified form and the image easily read. Another object of the invention is the provision of a compact, efficient and economical viewing unit wherein easy access is had to the various parts and particularly to those parts carrying the film which is put in from time to time for viewing. The film viewer of the present invention produces a clear and adequate image in an apparatus which is easily handled and operated. Still another object of the invention is the provision of a film viewer or reader having improved film handling mechanism permitting rotation of the film as may be necessary for projecting an image in the proper position to be read, and having automatically operating film gate means for holding the projected frame of film in its desired position.

Referring now in detail to the illustrative embodiment of the present invention shown by way of example in the accompanying drawings, and referring first to Fig. 1, the viewer comprises generally a cabinet 12 having a pair of side walls 13 turned toward each other at the back of the cabinet, a rear wall 14, inclined top wall 15, a lower vertical front wall portion 16, and an upper upwardly and rearwardly inclined front wall portion 17 which is the screen of the viewer where the projected image is seen. The viewer further generally comprises a light source 18 within the cabinet and adjacent one side thereof behind front panel 16, and light therefrom is adapted to be conveyed by a suitable mirror system through an angled tubular member, generally designated at 19, at the front of the cabinet to the central part of the device where it is directed through a film 20 suitably positioned at that place as hereinafter described. The film image is reflected from an upwardly and rearwardly inclined mirror 21 at the back of the cabinet to the viewing screen 17, which is preferably a ground glass plate.

Referring now in detail to the construction of the viewer, it will be noted in Fig. 2 that the inclined mirror 21 at the rear of the cabinet 12 is held in brackets 23 and 24 which are removably secured to the rear wall 14 of the cabinet. As shown in Figs. 3 to 5 inclusive, the ground glass plate 17 is removably held in a frame 25 by means of clamps 26, and the frame is mounted for easy removal from the cabinet. The frame carries a plurality of male connection members 27 which are adapted to cooperate with female members 28 held by screws 29 on the walls of the cabinet, forming a snap connection for the frame and plate on the cabinet.

The light source 18 in the form of an electric lamp is positioned within and at one side of the cabinet and is enclosed within a housing 30 joined to the lower front wall portion 16 of the cabinet. The housing 30 is preferably formed open at the bottom, and the bottom wall 31 of the cabinet is formed with an aperture 32 beneath the housing, so that free access of vetilating air is provided to lamp 18. The top wall of housing 30 is apertured at one side and a flue 33 is positioned above it and extends to the top of the cabinet, completing the ventilation system for the lamp through the bottom of the cabinet, through housing 30, and out the flue.

Referring now to the light conveyance and film handling means of the viewer, the lamp 18 is suitably mounted on a bracket 35 a rear arm of which carries a forwardly facing concave reflector or mirror 36 removably secured thereto and disposed rearwardly of the lamp. The majority of the elements of the light conveyance and film handling system is conveniently mounted for installation and removal of the same as a unit on a panel 37 which forms a part of and is removably secured by means of screws 38 in the lower front wall portion 16 of the cabinet, so that easy access may be had to the various elements for assembly or repair.

The tubular member 19 comprises an intermediate portion 22, terminal leg portions 92 and 93 and a central leg portion 46, the leg portions being spaced along the intermediate portion and extending correspondingly laterally therefrom. See particularly Figure 6. The tubular member is disposed horizontally in front of lower front wall portion 16 and the removable panel 37 with the intermediate portion 22 spaced forwardly from and parallel to the same and with the leg portions 92, 93 and 46 extending rearwardly, the leg portions 92 and 93 being disposed adjacent the sides of the cabinet and secured on the removable panel 37 by tap screws 39 and the leg portion 46 being disposed intermediate the sides of the panel and having its rear end adjacently spaced forwardly from the removable panel. The leg portion 92 is disposed in alinement with the lamp 18 and reflector 36 and with a light aperture 94 through the panel 37 adjacent the side of the cabinet adjacent which the lamp is disposed, so that light from the lamp and reflector is projected forwardly through the light aperture 94 and within and along the leg portion 92. The leg portion 46 is disposed in alinement with a projection aperture 95 through the panel 37 intermediate the sides of the cabinet.

The angle of the tubular member 19 which is formed by the juncture of the portions 22 and 92 is open at its outer portion and a cover 40 is detachably secured over this opening. A bracket 41, mounted on the inside of this cover, carries a mirror 42 at said juncture and within the tubular member, and this mirror is disposed at such an angle as to reflect light from the lamp 18 and reflector 36 within and along the intermediate portion 22 toward the juncture of the portions 22 and 46. The forward portion of the wall of the portion 22 at the juncture of the portions 22 and 46, is open and a cover 43 is detachably secured over this opening. A bracket 44, mounted on the inside of this cover, carries a mirror 45 at this juncture and within the tubular member, and this mirror is disposed at such an angle as to reflect light from the mirror 42 rearwardly within and along the leg portion 46 and through the projection aperture 95.

A condensing lens element 47 is disposed adjacent the lamp 18 and within the cabinet and immediately to the rear of the leg portion 92 and in alinement therewith, and is secured on the removable panel 37 by means of a holder 48. A second condensing lens element 49 is disposed within the rearward end portion of the leg portion 46 in alinement therewith and is held therein by a snap ring 50, and the condensing lens elements 47 and 49 provide a condensing lens means for concentrating light from the light source at the plane of a film holder, hereinafter described, disposed in front of and adjacent the lower front wall portion 16 and the removable panel 37 and between this wall portion and panel and rear end of the leg portion 46 which is spaced forwardly from this wall portion and panel. A suitable projecting lens 51 within the cabinet is secured by a holder 152 to the removable panel 37 in alinement with the projection aperture 95 and leg portion 46 for projecting images from a film in the film holder onto the screen 17 through the medium of the mirror 21.

The portion of the tubular member 19 comprising the leg portion 93 and the portion of the intermediate portion 22 between this leg portion and the leg portion 46, while it is not functional in so far as projection is concerned, provides additional rigidity to the support of the tubular member and the parts carried thereby and gives the reader a symmetrical appearance.

The film handling means for the viewer of the present invention is disposed in front of the lower front wall portion 16 and includes a pair of shafts 52 and 53 journalled for rotation in a saddle member 54 and being provided with suitable handles 55 so that the shafts may be manually rotated. The shafts 52 and 53 are adapted to receive suitable film carrying reels or spools, between which film may be transferred as various frames are put in position to be projected on screen 17. The viewer is adapted for use with either 16 mm. or 35 mm. film, as indicated in Fig. 7 of the drawings.

Means are provided for rotatably mounting the saddle 54 carrying the film so that the position of the projected image may be conveniently selected, and the saddle is also mounted for radial movement with respect to the leg portion 46 so that the film may be radially shifted to adjust or center the image on screen 17. As embodied, a sleeve 57 is journalled on the exterior cylindrical surface of the leg portion 46 for rotation thereon, and a spring pressed ball 58 is adapted to seat in depressions 59 located preferably at intervals of 90° about the circumference of the leg portion 46 to position the sleeve. Sleeve 57 is positioned against a shoulder 60 of the leg portion 46 and held in place by a snap ring 61.

As best shown in Fig. 7 an externally threaded rod 62 is secured in boss 63' of sleeve 57 and cooperates with an internally threaded sleeve 63 having a head 64 to effect manual adjustment of the sleeve. The sleeve is arranged in a boss 65 of saddle 54 and the saddle is adapted to follow movements of the sleeve by means of thrust surface 66 on the sleeve and the face of head 64. An annular spring member 67 is preferably arranged between the head 64 and boss 65 to prevent unintential rotation of sleeve 63.

It will be apparent from the construction described that the saddle 54 carrying the film for projection may be rotated as desired about the leg portion 46, and may also be moved radially with respect thereto by rotating sleeve 63.

Film holding means are provided for rigidly securing the film being projected in a predetermined plane, and the holding means are adapted to automatically disengage the film as it is advanced to bring another portion into projecting position by turning one of the handles 55. As embodied the pressure plate assembly comprises a fixed glass plate 70 carried in a frame 71, which is secured as by screws 72 to a forwardly extending portion of the saddle 54. A second glass plate 73 is carried by frame 74 and is resiliently mounted so that film 20 may be firmly held between plates 70 and 73 at the time of projection.

The mounting means for frame 74 comprises a pair of pins 75 and 76 having a close or driven fit in each of a pair of integral supporting portions 77 of saddle 54, and extending freely through suitable apertures in frame 74 so that the latter is movable on the pins, and coiled springs 78 are positioned on the pins to urge frame 74 toward frame 71. The supporting portions 77 are arranged to engage linear external surfaces provided at the end of sleeve 57, forming a guideway for the relative movement of saddle 54 on sleeve 57.

Each end of movable frame 74 is provided with a pair of arms 80 to rotatably support a guide roller 81 for the film extending through the pressure plate assembly. As clearly shown in Fig. 6 of the drawings, the rollers 81 are so arranged that the reach of the film 20 extending between them is slightly backwardly deflected between the peripheries of the rollers and the plates 70 and 73 when the latter are in film engaging position. When the film is to be advanced to project another portion thereof and one of the handles 55 is turned, the resulting tension on the film first straightens the reach between the rollers 81 and this forces frame 74 back against the pressure of springs 78 which takes plate 73 out of contact with the film. Further tension on the film continues the displacement of frame 74 so that the film is also removed from contact with plate 70, and it will be apparent that the pressure plate assembly is thus automatically disengaged from the film during film advance so that damage to the film by frictional contact is avoided. When advance of the film is halted, the pressure plates return to their original film engaging position as shown in Fig. 6.

Means are provided for separating the plates 70 and 73 and holding them in separated position when desired to thread film therebetween. As embodied such means comprise a pair of retracting members 85 of U configuration which are secured to supporting portions 77 by means of lower pins 76, which are provided with enlarged heads for the purpose. The retracting members extend upwardly from supporting portions 77, turn in horizontal portions 86, and then are downwardly turned in shorter depending portions 87 which are normally just out of contact with the frame 74. As best shown in Fig. 10 of the drawings the arms 80 of frame 74 are thickened to provide curved surfaces 89 forming cam surfaces for cooperation with portions 87 of the retracting members. The retracting members are held by lower pins 76 somewhat loosely so that they may be pivoted away from each other to engage surfaces 89 and displace frame 74 against springs 78. The retracting members may be positioned against rounded surfaces 90 and are then in a position to hold the pressure plates 70 and 73 apart. It will be seen that film may then be easily threaded between the plates and the retracting members 85 returned to their original positions when threading is completed. Triangular members 91 may if desired be secured to the horizontal portions 86 of the retracting members to provide a finger grip for more expeditious handling of the members.

What is claimed is:

1. In a device of the character described, the combination of a cabinet provided with an upper front wall portion formed by a viewing screen and a lower front wall portion having a projection aperture disposed intermediate the sides of said cabinet and a light aperture disposed adjacent a side of said cabinet, mirror means within and at the back of said cabinet for reflecting light from said projection aperture to said screen, a light source within said cabinet and adapted to project light forwardly through said light aperture, a tubular member associated with said cabinet and provided with an intermediate portion and two leg portions spaced along said intermediate portion and extending correspondingly laterally therefrom and disposed horizontally in front of said lower front wall portion with the intermediate portion thereof spaced forwardly from the same and with the leg portions thereof extending rearwardly and one of said leg portions being alined with said projection aperture and the other of said leg portions being alined with said light aperture, mirrors within said tubular member and respectively disposed at the junctures of said intermediate and leg portions and disposed at such angles as to reflect light from said light source through said projection aperture, a film holder associated with said projection aperture in front of and adjacent said lower front wall portion, a projection lens associated with said projection aperture and disposed rearwardly of said film holder, and condensing lens means associated with said tubular member and arranged between said light source and film holder.

2. In a device of the character described, the combination of claim 1 and further including, said projection aperture alined leg portion being spaced forwardly from said lower front wall portion and said film holder being disposed between this leg portion and this front wall portion, and mounting means carrying said film holder and comprising a bored mounting member having its bore engaged for rotation on said projection aperture alined leg portion to provide corresponding rotational adjustment of said film holder.

3. In a device of the character described, the combination of claim 1 and further including, said lower wall portion comprising a panel detachably secured on the cabinet and carrying said light source, tubular member, film holder, projection lens and condensing lens means for installation and removal of the same as a unit.

4. In a device of the character described, the combination of a cabinet provided with an upper upwardly and rearwardly inclined front wall portion formed by a viewing screen and a lower front wall portion having a projection aperture disposed intermediate the sides of said cabinet and a light aperture disposed adjacent a side of said cabinet, an upwardly and rearwardly inclined mirror within and at the back of said cabinet for reflecting light from said projection aperture to said screen, a light source within and disposed adjacent said cabinet side and adapted to project light forwardly through said light aperture, a tubular member associated with said cabinet and provided with an intermediate portion and two leg portions spaced along said intermediate portion and extending correspondingly laterally therefrom and disposed horizontally in front of said lower front wall portion with the intermediate portion thereof spaced forwardly from the same and with the leg portions thereof extending rearwardly and one of said leg portions being alined with said projection aperture and the other of said leg portions being alined with said light aperture, mirrors within said tubular member and respectively disposed at the angles formed by the junctures of said intermediate and leg portions and disposed at such angles as to reflect light from said light source through said projection aperture, a film holder associated with said projection aperture in front of and adjacent said lower wall portion and carried by the leg of said tubular member which is alined with said projection aperture, a projection lens associated with said projection aperture and disposed rearwardly of said film holder and within said cabinet and carried by said lower front wall portion, and condensing lens means associated with said tubular member and arranged between said light source and film holder.

5. In a device of the character described, the combination of claim 4 and further including, said projection aperture alined leg portion being spaced forwardly from said lower front wall portion and said film holder being disposed between this leg portion and this front wall portion, and mounting means carrying said film holder comprising a bored mounting member having its bore engaged for rotation on said projection aperture alined leg portion to provide corresponding rotational adjustment of said film holder and a second mounting member on which said film holder is mounted and mounted on said board mounting member for movement radially of said bore for corresponding adjustment of said film holder.

6. In a device of the character described, the combination of a cabinet provided with an upper upwardly and rearwardly inclined front wall portion formed by a viewing screen and a lower front wall portion havnig a projection aperture disposed intermediate the sides of said cabinet and a light aperture disposed adjacent a side of said cabinet, an upwardly and rearwardly inclined mirror within and at the back of said cabinet for reflecting light from said projection aperture to said screen, a light source within and disposed adjacent said cabinet side and adapted to project light forwardly through said light aperture, a tubular member provided with an intermediate portion and three leg portions spaced along said intermediate portion and extending correspondingly laterally therefrom and disposed horizontally in front of said lower front wall portion with the intermediate portion thereof spaced forwardly from the same and with the leg portions thereof extending rearwardly and with the central leg portion and one terminal leg portion thereof respectively alined with said projection and light apertures, the terminal leg members of said tubular member being secured to said lower front wall portion, mirrors within said tubular member and respectively disposed at the angles formed by the junctures of said intermediate, said central leg and said one terminal leg portions and disposed at such angles as to reflect light from said light source through said projection aperture, a film holder associated with said projection aperture in front of and adjacent said lower front wall portion, a projection lens associated with said projection aperture and disposed rearwardly of said film holder, and condensing lens means associated with said tubular member and arranged between said light source and film holder.

JOHN HALAHAN.
FLOYD A. LYON.
LYNN H. MORTIMER.
THEODORE F. ARONSON.

REFERENCES CITED

The following references are of record in the file of this patent:

UNITED STATES PATENTS

| Number | Name | Date |
| --- | --- | --- |
| 1,703,933 | Hartness et al. | Mar. 5, 1929 |
| 2,226,618 | Kuppenbender | Dec. 31, 1940 |
| 2,279,463 | Hopkins | Apr. 14, 1942 |
| 2,332,810 | Place | Oct. 26, 1943 |
| 2,381,634 | Back | Aug. 7, 1945 |
| 2,404,189 | Place | July 16, 1946 |
| 2,407,009 | Holbrook | Sept. 3, 1946 |
| 2,414,867 | Gradisar et al. | Jan. 28, 1947 |